Aug. 4, 1925. Re. 16,131

T. G. CRETNEY

TRAFFIC GUIDE

Original Filed May 18, 1923

Inventor

Thomas G. Cretney.

by Emery, Booth, Janney & Varney his Attorneys

Reissued Aug. 4, 1925. Re. 16,131

UNITED STATES PATENT OFFICE.

THOMAS G. CRETNEY, OF MADISON, WISCONSIN.

TRAFFIC GUIDE.

Original No. 1,479,227, dated January 1, 1924, Serial No. 639,982, filed May 18, 1923. Application for reissue filed January 30, 1925. Serial No. 5,906.

*To all whom it may concern:*

Be it known that I, THOMAS G. CRETNEY, a citizen of the United States, and a resident of Madison, in the county of Dane and State of Wisconsin, have invented an Improvement in Traffic Guides, of which the following description, in connection with the accompanying drawings, is a specification, like characters on the drawings representing like parts.

My invention relates to a practical means for directing traffic at street junctions and intersections; and the objects of my invention are, first, to provide a durable metal guide to be placed in, and secured to the center of a street; second, to have words of instruction cast on the guide in letters (that will retain their distinctness under the wear of traffic); third, to so locate the guides adjacent to the street intersections and danger points that obedience to the instructions thereon will effect proper regulation of the movement of traffic and prevent accidents.

In the accompanying drawings, wherein is selected for illustrative purposes one embodiment of my invention;

Figure 1:
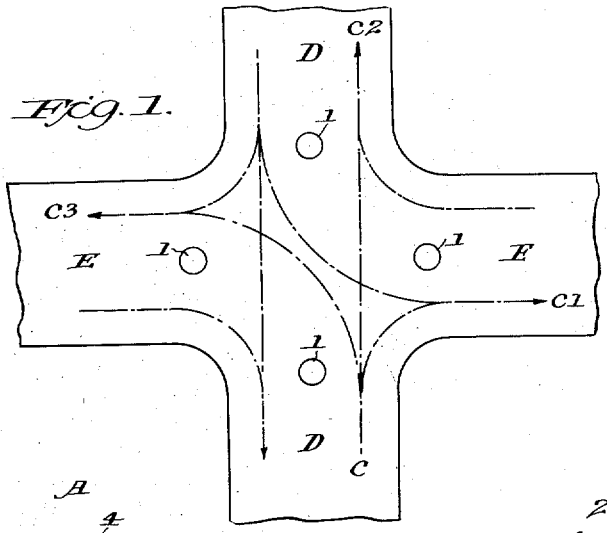
Fig. 1, is a diagram of a street intersection with four guides in position.
Figure 2:
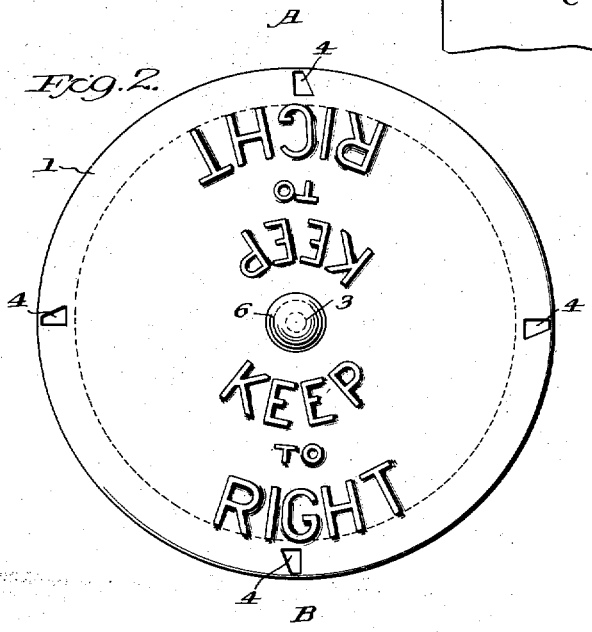
Fig. 2, is a plan
Figure 4:
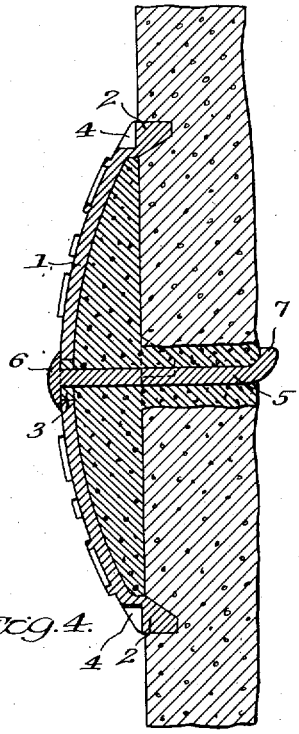
Fig. 4, is a vertical section on line A—B in Fig. 2, showing also a portion of concrete street to which the guide is anchored.
Figure 3:
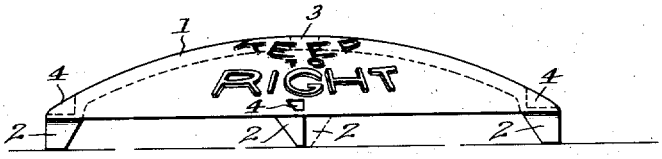
Fig. 3 is a front elevation of the guide.

In the embodiment of my invention illustrated in the drawings, the base or casing 1 is dome shaped and preferably is of metal formed as a hollow spherical segment and provided with a plurality of depending anchors or calks 2 spaced around the bottom near its outer edge or periphery. The anchors or calks 2 may be of any suitable shape adapted to resist movement of the device. As shown, said calks depend at right angles to the base on their right hand edges, but diverge from the point on the back and inside surfaces, giving support to the point. The base or casing 1 is formed with an opening 3 through the center thereof and with pockets 4 in the upper face near the periphery of the casing. Preferably these pockets are in alignment with and directly over the anchors or calks 2, and may be shaped to correspond with the shape of the points of the calks 2, to facilitate stacking one upon another during manufacture and packing for transportation. A bolt 5 with a head 6 and hook 7, is provided for securing the base or casing to the surface of a street at the desired location.

On the upper surface of the base or casing 1, and preferably upon diametrically opposite sides thereof, are cast suitable traffic instructions or indicia, such as "Keep to Right." The letters constituting such indicia are preferably cast or otherwise formed in the metal, and are advantageously raised a sufficient distance to protect the paint upon the body of the casing from wear and damage when struck by a vehicle wheel.

My guides may be readily and permanently installed in connection with a wide variety of pavements. A hole is first drilled in the street at the desired location, large enough to receive the hook end of the bolt. A small hole is then drilled for each of the calks 2, and the casing is set in place with the indicia transversely of the street, that is, facing the direction of traffic thereon. A thin mixture of cement and water is next poured through the hole 3 into the hollow casing, and the bolt 5 is inserted through the hole until the head 6 rests upon the casing 1. When the cement hardens the guide will be securely located.

In the case of "Keep to the right" guides, each device is located preferably in the middle of the street slightly back from the line of the curbing of the intersecting street, as shown in Fig. 1. In actual practice, in many instances I find it advantageous to place the guides adjacent to the line of the crosswalks of the intersecting streets.

In the diagram Fig. 1, it will be seen that a car C making a right hand turn from street D will enter into the traffic on the right side of street E at $C^1$, and going straight through will reach $C^2$. If making a left hand turn the car will be in line with the traffic on street E at $C^3$, thereby eliminating confusion at such places.

My guide will also be useful if placed at intervals in the center of paved country roads to keep traffic separated at a safe distance. Other locations and uses for guides embodying my invention will be readily occur to those concerned with the regulation of traffic.

My invention is not restricted to the details of construction shown and described.

What I claim is—

1. A traffic guide comprising a hollow convexed segment of metal with a plurality of depending calks around the bottom thereof, said calks being at right angles to the base on their right hand edge and diverging to their junction with the base, pockets for each of the calks, and with a hole through the top of the guide for holding an attaching bolt or through which cement may be poured, the top of the guide affording a prominent field for displaying traffic indicia.

2. A traffic guide comprising a hollow convexed segment of metal formed with a plurality of depending calks around the bottom thereof and with pockets for said calks in its top, and a central opening through the top through which an attaching bolt may be secured and through which cement may be poured, the top of the guide being formed to present a prominent field for traffic indicia.

3. A traffic guide comprising a hollow convexed segment of metal affording a field for traffic indicia on its top, said segment being formed with a plurality of depending calks around the bottom thereof and with a plurality of pockets each above one of the calks, and said guide also having a central opening adapted to receive an attaching bolt for securing it to adjacent guides for shipment or to the pavement.

4. In a traffic guide, a hollow metal casing presenting in its entirety a relatively low lying structure, and a filling of cementitious material for supporting said casing thereby to constitute a solid, metal armored, member affording a suitable field for integrally formed traffic regulating indicia.

5. In a traffic guide, a hollow metal casing presenting in its entirety a relatively low lying structure, peripheral anchoring means connected to said casing and embedded in the pavement, and a binding element of cementitious material adapted to fill and support said casing, thereby to present a solid member adapted to withstand traffic, the top of said member affording a prominent field for displaying traffic indicia.

6. In a traffic guide, a hollow metal shell having sloping sides for forming a prominent field for traffic indicia and capable of being nested within another shell of similar construction and shape for packing and shipping, said shells being imperforate except for an opening to receive a securing means.

7. In a traffic guide, a hollow metal shell capable of being nested with another shell of similar construction and shape for packing and shipping, and peripheral anchoring means depending from the bottom of said shells, said shells being imperforate except for an opening to receive a securing means.

8. In a traffic guide, a hollow metal casing presenting in its entirety a relatively low lying structure and having an imperforate upper surface except for a central opening to receive a central anchoring means, and central and peripheral anchoring means for securely fixing said casing to a pavement.

9. In a traffic guide a hollow dome shaped metal casing presenting in its entirety a relatively low lying structure, central and peripheral anchoring means connected to said casing and embedded in a pavement, and a binding element of cementitious material adapted to fill said casing and securely anchor said central anchoring means in said pavement.

10. In a traffic guide, a metallic member, depending anchoring elements on the bottom of said member, the outer face of said member being formed with seats for the depending anchoring elements of another guide, when a plurality of guides are nested together.

11. A traffic guide comprising a hollow metal casing presenting a relatively low lying structure, central and peripheral anchoring elements for fixedly securing said casing to a pavement, and a filling of cementitious material for said casing and surrounding said central anchoring element, the top of the casing sloping in opposite directions and forming a prominent field for displaying traffic indicia.

12. A traffic guide comprising a low cementitious body suitably fixed to the surface of a street or pavement, a metal armor for said cementitious body, means for securely fixing said armor to the surface of the street or pavement, said armor being imperforate except for an opening to receive a securing means and being suitable for receiving and displaying traffic indicating indicia and withstanding the wear of traffic.

13. In a traffic guide, a metal casing, in combination with peripheral calks depending from the bottom of said casing, and pockets formed in the top of the casing in alignment with and directly above said calks.

14. In a traffic guide, a metal casing, in combination with peripheral calks depending from the bottom of said casing and tapering towards a lower point, and pockets formed in the top of casing and shaped correspondingly to the point of said calks in alignment with and directly above said calks.

15. In a traffic guide, a metal casing, in combination with a plurality of spaced anchoring elements depending from the bottom of said casing, and pockets formed in the upper face of said casing and spaced apart correspondingly to the spacing of said calks.

In testimony whereof I have signed my name to this specification this 26th day of January, 1925.

THOMAS G. CRETNEY.